United States Patent
Suzuki (10) Patent No.: US 10,926,584 B2
(45) Date of Patent: Feb. 23, 2021

(54) PNEUMATIC TIRE

(71) Applicant: The Yokohama Rubber Co., LTD., Tokyo (JP)

(72) Inventor: Takayuki Suzuki, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/341,043

(22) PCT Filed: Sep. 29, 2017

(86) PCT No.: PCT/JP2017/035563
§ 371 (c)(1),
(2) Date: Apr. 10, 2019

(87) PCT Pub. No.: WO2018/070277
PCT Pub. Date: Apr. 19, 2018

(65) Prior Publication Data
US 2019/0225025 A1 Jul. 25, 2019

(30) Foreign Application Priority Data
Oct. 11, 2016 (JP) .............................. JP2016-199803

(51) Int. Cl.
*B60C 9/30* (2006.01)
*B60C 11/00* (2006.01)
(Continued)

(52) U.S. Cl.
CPC ............ *B60C 11/0304* (2013.01); *B60C 5/00* (2013.01); *B60C 9/18* (2013.01); *B60C 9/22* (2013.01);
(Continued)

(58) Field of Classification Search
CPC .......................... B60C 2011/0033; B60C 9/30
See application file for complete search history.

(56) References Cited

U.S. PATENT DOCUMENTS

2004/0069392 A1* 4/2004 Maruoka ................... B60C 3/04
152/454
2009/0095396 A1* 4/2009 Harikae ................ B60C 9/2006
152/527
(Continued)

FOREIGN PATENT DOCUMENTS

JP H05-096910 4/1993
JP H05-039804 6/1993
(Continued)

OTHER PUBLICATIONS

Machine Translation: JP-2011235812-A; Kamitoku, Koichi; (Year: 2019).*
(Continued)

*Primary Examiner* — Kendra Ly
(74) *Attorney, Agent, or Firm* — Thorpe North & Western (57) ABSTRACT

A pneumatic tire includes, in a tread portion, a belt layer including a circumferential belt layer with a belt cord disposed along a circumferential direction; and belt plies having a larger lateral direction dimension than a lateral direction dimension of the circumferential belt layer. A gauge from a surface of the tread portion to the belt layer is equal on a vehicle outer side and a vehicle inner side where the circumferential belt layer is disposed. At positions located away from a tire equatorial plane toward the vehicle outer side and the vehicle inner side by 120% of half of the lateral direction dimension of the circumferential belt layer, a gauge H1out on the vehicle outer side and a gauge H1in on the vehicle inner side to a belt ply of the belt plies located outermost in a radial direction satisfy $1\ mm \leq H1in - H1out \leq 3\ mm$.

11 Claims, 4 Drawing Sheets

(51) Int. Cl.
  *B60C 11/03* (2006.01)
  *B60C 9/22* (2006.01)
  *B60C 9/18* (2006.01)
  *B60C 5/00* (2006.01)
(52) U.S. Cl.
  CPC .............. *B60C 11/00* (2013.01); *B60C 11/03* (2013.01); *B60C 9/30* (2013.01); *B60C 2011/0033* (2013.01); *B60C 2011/0353* (2013.01); *B60C 2011/0355* (2013.01)

(56) References Cited

U.S. PATENT DOCUMENTS

| | | | |
|---|---|---|---|
| 2013/0220504 A1 | 8/2013 | Kurata | |
| 2013/0340905 A1 | 12/2013 | Bechon et al. | |
| 2015/0114536 A1 | 4/2015 | Rubber | |
| 2015/0136296 A1 | 5/2015 | Rubber | |
| 2015/0136297 A1 | 5/2015 | Rubber | |
| 2015/0151581 A1 | 6/2015 | Rubber | |
| 2015/0151582 A1 | 6/2015 | Rubber | |
| 2015/0165822 A1 | 6/2015 | Rubber | |
| 2015/0165823 A1 | 6/2015 | Rubber | |
| 2015/0273943 A1 | 10/2015 | Rubber | |
| 2015/0283855 A1* | 10/2015 | Kobayashi | B60C 11/01 152/209.18 |
| 2016/0068023 A1 | 3/2016 | Rubber | |

FOREIGN PATENT DOCUMENTS

| | | |
|---|---|---|
| JP | 2011235812 A * | 11/2011 |
| JP | 2012-153215 | 8/2012 |
| JP | 2013-220808 | 10/2013 |
| JP | 2013-543815 | 12/2013 |
| JP | 2014-213649 | 11/2014 |
| JP | 5745539 | 7/2015 |
| WO | WO 2012/066766 | 5/2012 |
| WO | WO 2012/069603 | 5/2012 |
| WO | WO 2014/010093 | 1/2014 |
| WO | WO 2014/010348 | 1/2014 |
| WO | WO 2014/010349 | 1/2014 |
| WO | WO 2014/010350 | 1/2014 |
| WO | WO 2014/010351 | 1/2014 |
| WO | WO 2014/010352 | 1/2014 |
| WO | WO 2014/010353 | 1/2014 |
| WO | WO 2014/057552 | 4/2014 |
| WO | WO 2014/175276 | 10/2014 |

OTHER PUBLICATIONS

International Search Report for International Application No. PCT/JP2017/035563 dated Dec. 26, 2017, 4 pages, Japan.

* cited by examiner

| | CONVENTIONAL EXAMPLE | COMPARATIVE EXAMPLE | EXAMPLE 1 | EXAMPLE 2 | EXAMPLE 3 | EXAMPLE 4 | EXAMPLE 5 | EXAMPLE 6 |
|---|---|---|---|---|---|---|---|---|
| PRESENCE OR ABSENCE OF CIRCUMFERENTIAL BELT LAYER | YES | NO | YES | YES | YES | YES | YES | YES |
| GAUGE DIFFERENCE BETWEEN VEHICLE OUTER SIDE AND VEHICLE INNER SIDE IN RANGE IN WHICH CIRCUMFERENTIAL BELT LAYER IS DISPOSED (mm) | 0.8 | - | 0.8 | 0.5 | 0.5 | 0.5 | 0.5 | 0.5 |
| H1in - H1out (mm) | 0.8 | - | 1.0 | 1.5 | 2.5 | 3.0 | 2.0 | 2.0 |
| H2in - H2out (mm) | 0.5 | 0.5 | 0.5 | 0.5 | 0.5 | 0.5 | 1.0 | 1.5 |
| W/Wr | 0.85 | - | 0.85 | 0.85 | 0.85 | 0.85 | 0.85 | 0.85 |
| D/W1 | 0.06 | - | 0.06 | 0.06 | 0.06 | 0.06 | 0.06 | 0.06 |
| RESISTANCE TO SHOULDER UNEVEN WEAR | 100 | 90 | 105 | 108 | 110 | 107 | 109 | 113 |

FIG. 3

| | EXAMPLE 7 | EXAMPLE 8 | EXAMPLE 9 | EXAMPLE 10 | EXAMPLE 11 | EXAMPLE 12 | EXAMPLE 13 | EXAMPLE 14 |
|---|---|---|---|---|---|---|---|---|
| PRESENCE OR ABSENCE OF CIRCUMFERENTIAL BELT LAYER | YES | YES | YES | YES | YES | YES | YES | YES |
| GAUGE DIFFERENCE BETWEEN VEHICLE OUTER SIDE AND VEHICLE INNER SIDE IN RANGE IN WHICH CIRCUMFERENTIAL BELT LAYER IS DISPOSED [mm] | 0.5 | 0.5 | 0.5 | 0.5 | 0.5 | 0.5 | 0.5 | 0.5 |
| H1in − H1out (mm) | 2.0 | 2.0 | 2.0 | 2.0 | 2.0 | 2.0 | 2.0 | 2.0 |
| H2in − H2out (mm) | 2.5 | 3.0 | 2.0 | 2.0 | 2.0 | 2.0 | 2.0 | 2.0 |
| W/Wr | 0.85 | 0.85 | 0.90 | 0.95 | 1.05 | 1.10 | 1.00 | 1.00 |
| D/W1 | 0.06 | 0.06 | 0.06 | 0.06 | 0.06 | 0.06 | 0.01 | 0.05 |
| RESISTANCE TO SHOULDER UNEVEN WEAR | 114 | 110 | 114 | 117 | 118 | 115 | 123 | 121 |

FIG. 4

PNEUMATIC TIRE

TECHNICAL FIELD

The present technology relates to a pneumatic tire.

BACKGROUND ART

For example, Japan Unexamined Patent Publication No. H05-039804 describes an asymmetrical pneumatic tire having improved wear resistance in a shoulder portion. This pneumatic tire satisfies: that a tread portion has an asymmetrical shape, the tread portion including a carcass and a reinforcing belt layer each having symmetrical structure with respect to a wheel center surface, in a profile shape of the tread portion, the maximum outer diameter point is disposed in a middle portion between the wheel center surface and one tread end, and the distance between the maximum outer diameter point and the wheel center surface is almost 1/10 of a tire maximum width; that, when shapes of tread portions located in opposite sides of the maximum outer diameter point are approximated with two arcs, a radius of curvature $R_2$ of a narrow portion is larger than a radius of curvature $R_3$ of a wide portion, and both arcs have a common tangent line in the maximum outer diameter point; and that a difference $R_2$-$R_3$ of the radius of curvature $R_2$ and the radius of curvature $R_3$ is almost 1/6 of the maximum outer diameter of the tire.

For example, Japan Patent No. 5745539 discloses a pneumatic tire having improved uneven wear resistance of a tire for uneven wear caused by accelerated wear of tread rubber in a shoulder portion. In this pneumatic tire, a plurality of reinforcing layers and a tread are disposed in order, outward in the tire radial direction of a crown portion of a carcass extending across a pair of bead portions in a toroidal form. When this pneumatic tire is mounted to a specified rim, and the tire internal pressure is set to 5% of a specified internal pressure, a reinforcing layer located outermost in the tire radial direction among the plurality of reinforcing layers has a portion curved in a convex shape outward in the tire radial direction in at least one of half parts in the tire lateral direction, and extends inward in the tire radial direction from a corner portion of the curved portion to an end portion of the outermost reinforcing layer. An interval in the tire radial direction between the outermost reinforcing layer and an outside profile line that is a virtual line in a case it is assumed that there is no ridge/groove in a surface of the tread, gradually decreases from a tire equatorial plane to the corner portion of the curved portion, and gradually increases from the corner portion of the curved portion to the end portion of the outermost reinforcing layer, in the tire lateral direction.

In recent years, in large trucks or buses, for the purpose of fuel economy or weight reduction for improving transportation efficiency, demand has been increasing for using a pneumatic tire of single mounting instead of a conventional pneumatic tire of dual mounting, as a pneumatic tire mounted to a drive shaft or trailer shaft.

However, since a pneumatic tire of single mounting has a wide developed tread width as compared with a pneumatic tire of dual mounting, the ground contact pressure varies largely depending on the region in the tire lateral direction, and uneven wear is easy to occur. In particular, since a shoulder drop in a shoulder region at the time of inflation is large, the ground contact pressure is lower and sliding is relatively larger than those in a center region, and uneven wear is easy to occur in the shoulder region.

In large trucks or buses, a camber angle of a wheel is often set to positive camber. In this case, the ground contact pressure in the vicinity of a shoulder portion on a vehicle inner side at the time of mounting on the vehicle tends to be lower than the ground contact pressure in the vicinity of a shoulder portion on a vehicle outer side. In a case where the ground contact pressure is low, a radial growth due to rotation of the wheel at the time of vehicle traveling is large. As a result, the radial growth tends to be larger in the vicinity of the shoulder portion on the vehicle inner side than in the vicinity of the shoulder portion on the vehicle outer side. When the radial growth is large, the degree of rubbing of the tread surface with respect to the road surface at the time of rotation of the wheel is large, and as a result, wear is easy to occur. Thus, in a case where the radial growth in the vicinity of the shoulder portion on the vehicle inner side is large, wear is easy to occur in the vicinity of the shoulder portion on the vehicle inner side. Accordingly, in a pneumatic tire that is single-mounted to a large truck or bus, wear in the vicinity of a shoulder portion on a vehicle inner side is larger than wear in the vicinity of a shoulder portion on a vehicle outer side, and shoulder uneven wear may be easy to occur.

SUMMARY

The present technology provides a pneumatic tire that has improved resistance to shoulder uneven wear.

A pneumatic tire according to an aspect of the present technology is a pneumatic tire having designated vehicle inner and outer orientations at the time of mounting on a vehicle, the pneumatic tire including:

in a tread portion, a belt layer including a circumferential belt layer in which a belt cord is disposed along a tire circumferential direction, and a plurality of belt plies having a larger tire lateral direction dimension than a tire lateral direction dimension of the circumferential belt layer in which a belt cord is inclined toward the tire circumferential direction; wherein a tread gauge from a tread surface of the tread portion to the belt layer is equal on a vehicle outer side and a vehicle inner side in a range in which the circumferential belt layer is disposed; and at positions located away from a tire equatorial plane toward the vehicle outer side and the vehicle inner side by 120% of half of the tire lateral direction dimension of the circumferential belt layer, a gauge H1out on the vehicle outer side and a gauge H1in on the vehicle inner side to a belt ply of the plurality of belt plies located outermost in a tire radial direction satisfy 1 mm≤H1in−H1out≤3 mm.

According to this pneumatic tire, a tread gauge on the vehicle inner side is formed to be thicker than that on the vehicle outer side in a position in the vicinity of the shoulder portion and in the vicinity of an end portion of the tire lateral direction of the belt layer. Therefore, the amount of a shoulder drop in the vicinity of the shoulder portion on the vehicle inner side at the time of inflation is smaller than that on the vehicle outer side, and the relative difference in the ground contact pressure of this portion with other portions is small, and the sliding difference of the tread surface is suppressed to small. As a result, a friction energy in the vicinity of the shoulder portion on the vehicle inner side can be reduced, and resistance to shoulder uneven wear can be improved.

In a pneumatic tire according to an aspect of the present technology, it is preferable that a gauge H2out on the vehicle outer side and a gauge H2in on the vehicle inner side in the shortest distance from a contact edge of the tread portion to a belt ply of the plurality of belt plies with a tire lateral direction maximum dimension satisfy 1 mm≤H2in−H2out≤3 mm.

According to this pneumatic tire, a tread gauge on the vehicle inner side is formed to be thicker than that on the vehicle outer side in the vicinity of the contact edge. Therefore, the amount of a shoulder drop in the vicinity of the shoulder portion on the vehicle inner side at the time of inflation is smaller than that on the vehicle outer side, and the relative difference in the ground contact pressure of this portion with other portions is small, and the sliding difference of the tread surface is suppressed to small. As a result, a friction energy in the vicinity of the shoulder portion on the vehicle inner side can be reduced, and resistance to shoulder uneven wear can be improved.

In a pneumatic tire according to an aspect of the present technology, it is preferable that a plurality of circumferential main grooves extending along the tire circumferential direction in the tread surface are formed side by side in the tire lateral direction, and a dimension Wr between insides in the tire lateral direction of circumferential main grooves of the plurality of circumferential main grooves located outermost in the tire lateral direction and a tire lateral direction dimension W of the circumferential belt layer satisfy 0.9≤W/Wr≤1.1.

According to this pneumatic tire, circumferential belt layers are disposed inward in the tire radial direction of all land portions excluding a land portion in the tire lateral direction outermost side, to suppress the radial growth. As a result, resistance to shoulder uneven wear can be further improved.

In a pneumatic tire according to an aspect of the present technology, it is preferable that, when the pneumatic tire is mounted on a regular rim, inflated to the regular internal pressure, and in an unloaded state, a tire radial direction dimension D between an intersection point P of the tread surface and an auxiliary line L1 extending from an end portion of the circumferential belt layer outward in the tire radial direction and an auxiliary line L2 extending in the tire lateral direction from the tire radial direction maximum position in the tread surface, and a tire lateral direction distance W1 from the tire equatorial plane to the end portion of the circumferential belt layer satisfy 0.01≤D/W1≤0.05.

According to this pneumatic tire, in a range from the tire equatorial plane to the tire lateral direction distance W1 of the circumferential belt layer, the difference with the tire radial direction maximum position of the tread surface satisfies 0.01≤D/W1≤0.05, and the suppression effect of the radial growth in the range of the tire lateral direction dimension of the circumferential belt layer is remarkable. As a result, the pneumatic tire can contribute to improvement in resistance to uneven wear in the vicinity of the shoulder portion that is in the range of the outward in the tire lateral direction of the circumferential belt layer.

In a pneumatic tire according to an aspect of the present technology, it is preferable that the pneumatic tire is a heavy duty tire of single mounting having a nominal width of 355 mm or greater, an aspect ratio of 55% or less, and a rim diameter of 17.5 inches or greater.

According to this pneumatic tire, the tire is applied to a heavy duty tire of single mounting having the size as described above adopting the single mounting method in which one wheel is used, instead of being used for dual mounting in which two wheels are superimposed and mounted on the vehicle lateral direction in each end side of the drive shaft or trailer shaft, and this can provide a remarkable effect of improving resistance to shoulder uneven wear.

In a pneumatic tire according to an aspect of the present technology, it is preferable that the relationship between the gauge H1out on the vehicle outer side and the gauge H1in on the vehicle inner side is set such that the belt layer is symmetrically disposed in the tire lateral direction with the tire equatorial plane as a center, and profiles of the tread surface are made different in the tire lateral direction with the tire equatorial plane as a center.

According to this pneumatic tire, the tire can be manufactured by changing only a mold forming the treat surface, without changing others.

In a pneumatic tire according to an aspect of the present technology, it is preferable that the relationship between the gauge H1out on the vehicle outer side and the gauge H1in on the vehicle inner side is set such that the profiles of the tread surface are symmetrically disposed in the tire lateral direction with the tire equatorial plane as a center, and an arrangement of the belt layer is made different in the tire lateral direction with the tire equatorial plane as a center.

According to this pneumatic tire, the tire can be manufactured by changing the configuration of the belt layer, without changing a mold forming the treat surface.

In a pneumatic tire according to an aspect of the present technology, it is preferable that the relationship between the gauge H1out on the vehicle outer side and the gauge H1in on the vehicle inner side is set such that the profiles of the tread surface are made different in the tire lateral direction with the tire equatorial plane as a center, and an arrangement of the belt layer is made different in the tire lateral direction with the tire equatorial plane as a center.

According to this pneumatic tire, the profiles of the tread surface and the arrangement of the belt layers are made different to establish a relationship between the gauge H1out on the vehicle outer side and the gauge H1in on the vehicle inner side, and thus, while a situation where the profiles of the tread surface and the arrangement of the belt layers are largely unevenly different in the vehicle outer side and the vehicle inner side is prevented, an effect of improving resistance to shoulder uneven wear can be obtained.

According to the present technology, resistance to shoulder uneven wear can be improved.

DETAILED DESCRIPTION

Embodiments of the present technology are described in detail below with reference to the drawings. However, the present technology is not limited by the embodiments. Constituents of the embodiments include elements that can be substituted or easily conceived by one skilled in the art, or that are essentially identical. Furthermore, the modified examples described in the embodiments can be combined as desired within the scope apparent to one skilled in the art.

Figure 1:
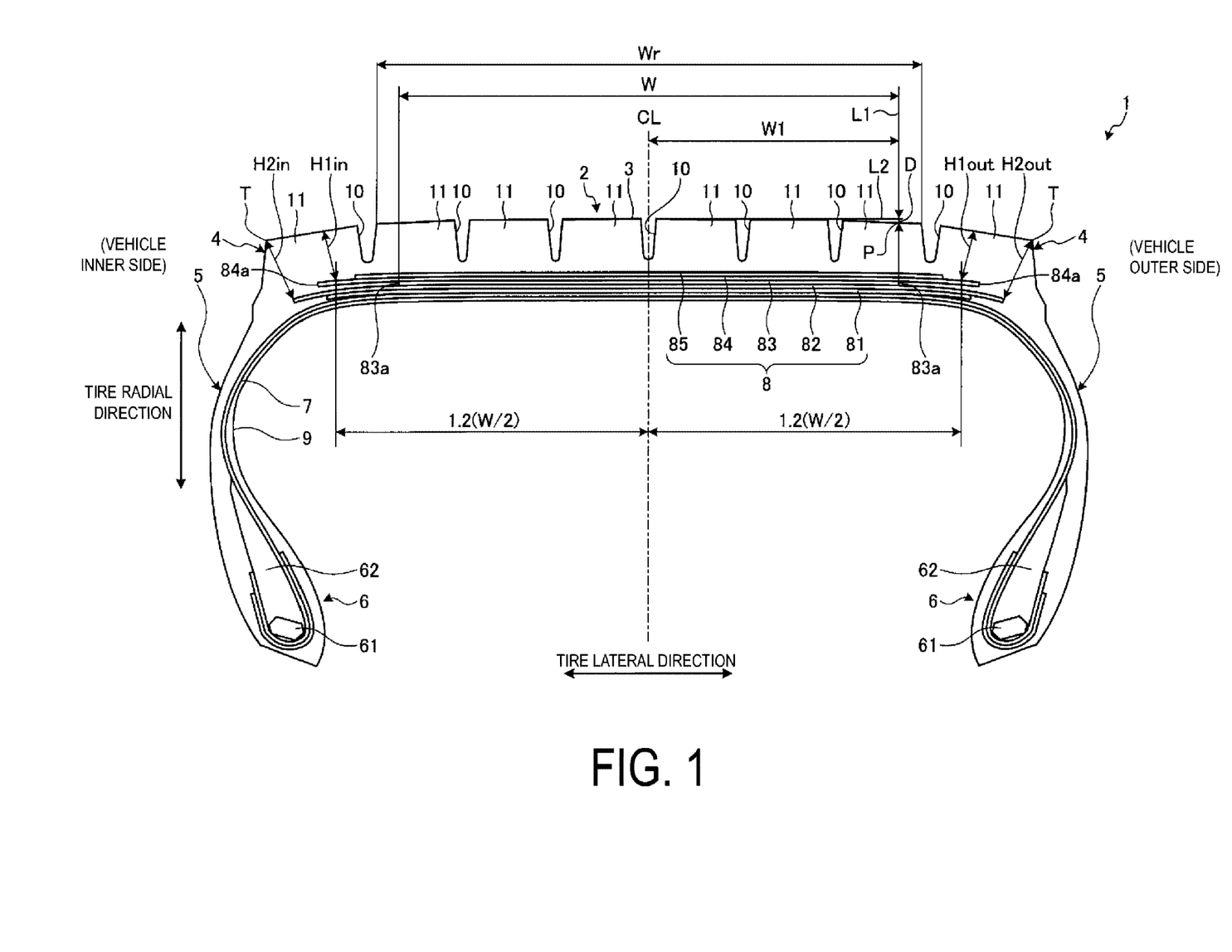
FIG. 1 is a meridian cross-sectional view of a pneumatic tire according to an embodiment of the present technology.
Figure 2:
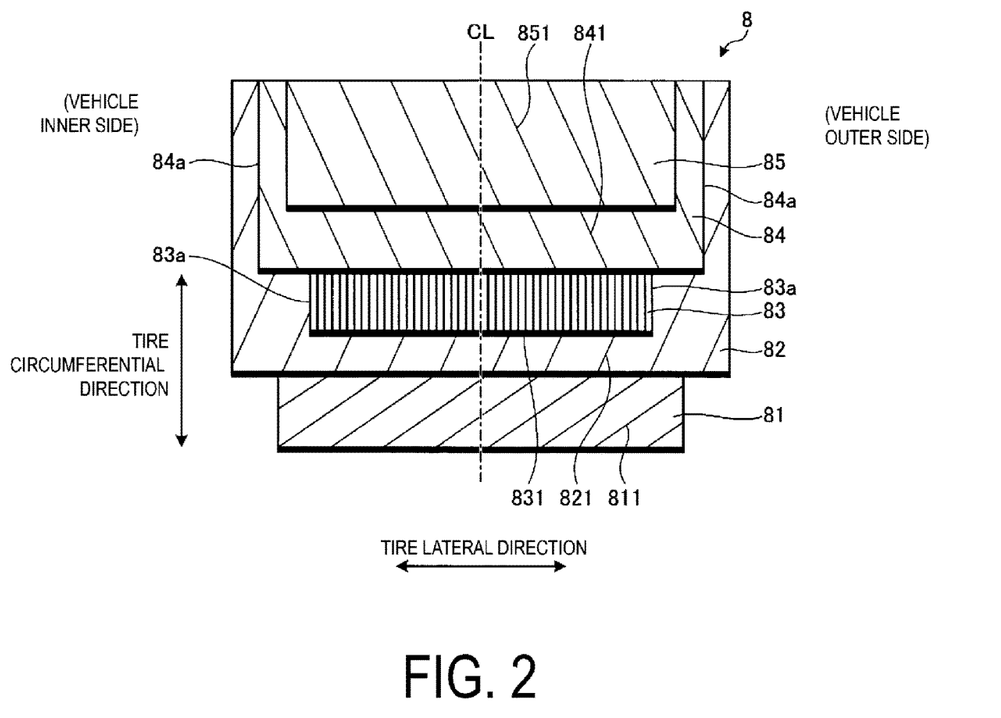
FIG. 2 is a partial developed view of a belt layer of a pneumatic tire according to the present embodiment of the present technology.

FIG. 1 is a meridian cross-sectional view of a pneumatic tire according to the present embodiment. FIG. 2 is a partial developed view of a belt layer of a pneumatic tire according to the present embodiment.

Herein, "tire radial direction" refers to the direction orthogonal to the rotation axis (not illustrated) of a pneumatic tire 1. "Inward in the tire radial direction" refers to the direction toward the rotation axis in the tire radial direction. "Outward in the tire radial direction" refers to the direction away from the rotation axis in the tire radial direction. Additionally, "tire lateral direction" refers to the direction parallel with the rotation axis. "Inward in the tire lateral direction" refers to the direction toward a tire equatorial plane CL in the tire lateral direction. "Outward in the tire lateral direction" refers to the direction away from the tire equatorial plane CL in the tire lateral direction. "Tire circumferential direction" refers to the circumferential direction with the rotation axis as the center axis. "Tire equatorial plane CL" refers to the plane orthogonal to the rotation axis of a pneumatic tire 1 that passes through the center of the tire width of the pneumatic tire 1. "Tire width" is the width in the tire lateral direction between components located outward in the tire lateral direction, or in other words, the distance between the components that are the most distant from the tire equatorial plane CL in the tire lateral direction.

As illustrated in FIG. 1, the pneumatic tire 1 includes a tread portion 2, shoulder portions 4 on opposite sides of the tread portion 2, and sidewall portions 5 and bead portions 6 continuing on from the shoulder portions 4 in that order. The pneumatic tire 1 also includes a carcass layer 7, a belt layer 8, and an innerliner layer 9.

The tread portion 2 is made of a rubber material (tread rubber) and is exposed on the outermost side of the pneumatic tire 1 in the tire radial direction, with the surface thereof constituting the profile of the pneumatic tire 1. The outer circumferential surface of the tread portion 2 is formed as a tread surface 3, which is a portion that comes into contact with a road surface when a vehicle (not illustrated in the drawings) mounted with the pneumatic tire 1 is traveling. A circumferential main groove 10 is formed extending in the tire circumferential direction in the tread surface 3. A plurality of the circumferential main grooves 10 (seven in the present embodiment) are disposed side by side in the tire lateral direction. Although not illustrated in the drawings, a plurality of lug grooves intersecting the tire circumferential direction may be formed in the tread surface 3. In the tread surface 3, a plurality of land portions 11 are defined by the circumferential main grooves 10 and the lug grooves.

The circumferential main groove 10 is a groove having a groove width of from 6 mm to 14 mm, having a groove depth of from 10 mm to 26 mm, and extending in the tire circumferential direction. The circumferential main groove 10 may be curved or bent in the tire lateral direction while extending in the tire circumferential direction. In the present embodiment, the circumferential main groove 10 is disposed symmetrically in the tire lateral direction with the tire equatorial plane CL as a boundary.

The shoulder portions 4 are portions of the tread portion 2 located outward in the tire lateral direction on both sides. Additionally, the sidewall portions 5 are exposed on the outermost sides of the pneumatic tire 1 in the tire lateral direction. The bead portions 6 each include a bead core 61 and a bead filler 62. The bead core 61 is formed by winding a bead wire, which is a steel wire, into an annular shape. The bead filler 62 is a rubber material that is disposed in the space formed outward of the bead core 61 in the tire radial direction by an end of the carcass layer 7 in the tire lateral direction being folded back at the position of the bead core 61.

The end portions of the carcass layer 7 in the tire lateral direction are folded back around the pair of bead cores 61 from inward to outward in the tire lateral direction, and the carcass layer 7 is stretched in a toroidal shape in the tire circumferential direction to form the framework of the tire. The carcass layer 7 is made of coating rubber-covered and rolled carcass cords (not illustrated) disposed side by side with an angle with respect to the tire circumferential direction along the tire meridian direction at an angle with respect to the tire circumferential direction (for example, from ±85° to ±95°, as an absolute value). The carcass cords are made of steel or organic fibers (polyester, rayon, nylon, or the like). The carcass layer 7 includes at least one layer.

The belt layer 8 has a multilayer structure in which a plurality (five in the present embodiment) of belt plies 81, 82, 83, 84, 85 are layered in the tire radial direction. In the tread portion 2, the belt layer 8 is disposed on the outer circumference of the carcass layer 7 outward in the tire radial direction, and covers the carcass layer 7 in the tire circumferential direction. Each of the plies 81, 82, 83, 84, 85 is made of a plurality of coating rubber-covered and rolled belt cord 811, 821, 831, 841, 851 (illustrated in FIG. 2) disposed side by side with an angle with respect to the tire circumferential direction. The belt cords 811, 821, 831, 841, 851 are made of steel or organic fibers (polyester, rayon, nylon, or the like).

The innerliner layer 9 is the tire inner surface, i.e. the inner circumferential surface of the carcass layer 7, reaches the lower portion of the bead cores 61 of the pair of bead portions 6 at both end portions in the tire lateral direction and the bead toe, and extends in the tire circumferential direction in a toroidal shape. The innerliner layer 9 suppresses the permeation of air molecules and does not include any cords.

Details of the belt layer 8 will be described below. As described above, the belt layer 8 has a multilayer structure in which a plurality of belt plies 81, 82, 83, 84, 85 are layered in the tire radial direction. Specifically, the belt layer 8 includes a high angle belt 81, an inner cross belt 82, a circumferential belt layer 83, an outer cross belt 84, and a belt cover 85, as the belt plies 81, 82, 83, 84, 85 from inward in the tire radial direction.

The high angle belt 81 is disposed continuously between opposite sides of the tire lateral direction on the tire equatorial plane CL and is made of a plurality of coating rubber-covered and rolled belt cords 811. The belt cord 811 has a belt angle that is an inclination angle with respect to the tire circumferential direction, of from ±45° to ±70°, as an absolute value.

The inner cross belt 82 is disposed continuously between opposite sides of the tire lateral direction on the tire equatorial plane CL and is made of a plurality of coating rubber-covered and rolled belt cords 821. The belt cord 821 has a belt angle that is an inclination angle with respect to the tire circumferential direction, of from ±10° to ±45°, as an absolute value.

The circumferential belt layer 83 is disposed continuously between opposite sides of the tire lateral direction on the tire equatorial plane CL and is made of a plurality of coating rubber-covered and rolled belt cords 831. The belt cord 831 has a belt angle that is an inclination angle with respect to the tire circumferential direction of ±5°, as an absolute value, is wound in a spiral, and is disposed substantially along the tire circumferential direction.

The outer cross belt 84 is disposed continuously between opposite sides of the tire lateral direction on the tire equatorial plane CL and is made of a plurality of coating rubber-covered and rolled belt cords 841. The belt cord 841 has a belt angle that is an inclination angle with respect to the tire circumferential direction of from ±10° to ±45°, as an absolute value.

The belt cover 85 is disposed continuously between opposite sides of the tire lateral direction on the tire equatorial plane CL and is made of a plurality of coating rubber-covered and rolled belt cords 851. The belt cord 851 has a belt angle that is an inclination angle with respect to the tire circumferential direction of from ±10° to ±45°, as an absolute value.

The belt cords 821 of the inner cross belt 82 has an inclination direction opposite from that of the belt cords 841 of the outer cross belt 84. In other words, the inner cross belt 82 and the outer cross belt 84 are layered such that the inclination directions of the belt cords 821, 841 cross with each other, i.e. a cross ply structure, and are provided as a pair of cross belt layers. The inner cross belt 82 and the outer cross belt 84 provided as a cross belt layer are provided with different tire lateral direction dimensions. The outer cross belt 84 is provided to be narrower than the inner cross belt 82, and the outer cross belt 84 is disposed within a range of the tire lateral direction dimension of the inner cross belt 82. Accordingly, the outer cross belt 84 is formed as a narrow belt in the cross belt layer, and the inner cross belt 82 is formed as a wide belt in the cross belt layer.

With respect to the inner cross belt 82 and the outer cross belt 84 provided as a cross belt layer, the high angle belt 81 is provided such that the inclination direction of the belt cord 811 is in the same direction with respect to the belt cord 821 of the inner cross belt 82 layered outward in the tire radial direction. The high angle belt 81 is provided so as to have a narrower tire lateral direction dimension than that of the inner cross belt 82 and is disposed within a range of the tire lateral direction dimension of the inner cross belt 82. The belt cover 85 is provided such that the inclination direction of the belt cord 851 is in the same direction with respect to the belt cord 841 of the outer cross belt 84 layered inward in the tire radial direction. The belt cover 85 is provided so as to have a narrower tire lateral direction dimension than that of the outer cross belt 84 and is disposed within a range of the tire lateral direction dimension of the outer cross belt 84. The circumferential belt layer 83 is provided between the inner cross belt 82 and the outer cross belt 84. The circumferential belt layer 83 is provided so as to have a narrower tire lateral direction dimension than that of the narrow outer cross belt 84 in the inner cross belt 82 and the outer cross belt 84 as the cross belt layer and is disposed within a range of the tire lateral direction dimension of the inner cross belt 82 and the outer cross belt 84.

In cases where the pneumatic tire 1 of this embodiment configured as described above is mounted on a vehicle, orientations in the tire lateral direction with respect to the inner side and the outer side of the vehicle are designated, i.e. vehicle inner/outer side orientations at the time of mounting on the vehicle are designated. The orientation designation, while not illustrated in the drawings, for example, can be shown via indicators provided on the sidewall portions 5. Therefore, the side facing the inner side of the vehicle when mounted on the vehicle is the "vehicle inner side", and the side facing the outer side of the vehicle is the "vehicle outer side". The indicator, for example, is composed of a mark or ridges/grooves on the sidewall portion 5 of the tire. For example, Economic Commission for Europe Regulation 54 (ECE R54) requires that an indicator is provided on the sidewall portion 5 on the vehicle outer side when the tire is mounted on a vehicle. Note that the designation of the vehicle inner side and the vehicle outer side is not limited to cases where the tire 1 is mounted on a vehicle. For example, in cases when the tire is mounted on a rim, orientation of the rim with respect to the inner side and the outer side of the vehicle in the tire lateral direction is predetermined. Thus, in cases in which the pneumatic tire 1 is mounted on a rim, the orientation with respect to the vehicle inner side and the vehicle outer side in the tire lateral direction is designated.

Further, the pneumatic tire 1 of the present embodiment is a heavy duty pneumatic tire mounted on a drive shaft or trailer shaft of a large vehicle such as a truck, bus, or the like for the purpose of long distance transport. Further, the pneumatic tire 1 of the present embodiment is a heavy duty pneumatic tire (heavy duty tire of single mounting) single-mounted on each end side of a drive shaft or trailer shaft of a large vehicle such as a truck, bus, or the like for the purpose of long distance transport.

In the pneumatic tire 1 configured as described above, the tread gauge from the tread surface 3 of the tread portion 2 to the belt layer 8 is defined as described below. First, the tread gauges are formed to be equal on the vehicle outer side and the vehicle inner side in the range in which the circumferential belt layer 83 is disposed (the range of the tire lateral direction dimension between the end portions 83a of the circumferential belt layer 83. This "equal" means that the difference in distance from the tread surface 3 to the outermost position in the tire radial direction of the belt layer 8 is 1 mm or less in positions in the same distance from the tire equatorial plane CL to the vehicle outer side and the vehicle inner side.

At positions located away from the tire equatorial plane CL toward the vehicle outer side and the vehicle inner side by 120% of half of the tire lateral direction dimension W between the end portions 83a of the circumferential belt layer 83, the tread gauge has the gauge H1out on the vehicle outer side and the gauge H1in on the vehicle inner side in the belt ply in the outermost side in the tire radial direction (illustrated as the outer cross belt 84 in FIG. 1) satisfying 1 mm≤H1in−H1out≤3 mm.

Here, in the belt layer 8, it is preferable that the tire lateral direction dimension between the end portions 84a of the outer cross belt 84 is in a range of 1.25≤W/2≤1.4 with respect to half of the tire lateral direction dimension W between the end portions 83a of the circumferential belt layer 83. The tire lateral direction dimension of the inner cross belt 82 is larger than the range of the outer cross belt 84, and the belt cover 85 is smaller than the circumferential belt layer 83. Therefore, the belt ply in the shortest distance to the tread surface 3 at the position located away by 120% of half of the tire lateral direction dimension W between the end portions 83a of the circumferential belt layer 83 is the outer cross belt 84.

When the pneumatic tire 1 according to the present embodiment is mounted on the vehicle, the pneumatic tire is mounted on a regular rim and inflated to the regular internal pressure. Then, the pneumatic tire 1 is mounted on the vehicle and loaded with a load within a range of the regular load. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. "Regular load" refers a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

When the pneumatic tire 1 is mounted on a vehicle and the vehicle is driven, the pneumatic tire 1 rotates with the tread surface 3 of the tread surface 3 located at the bottom coming into contact with the road surface. As a result, the vehicle transmits the driving force or braking force to the road surface or generates the turning force by the friction force between the tread surface 3 of the pneumatic tire 1 and the road surface, to travel.

During vehicle traveling, in the pneumatic tire 1, a centrifugal force around the tire rotation axis is generated by rotation. This centrifugal force is also generated in the belt layer 8. The belt layer 8 exerts the hoop effect to reinforce the tread portion 2 and secure rigidity, or to support the carcass layer 7 and the tread portion 2 and set the entire shape of the tire. In particular, the pneumatic tire 1 of the present embodiment includes not only the high angle belt 81, the inner cross belt 82, and the outer cross belt 84, but also the circumferential belt layer 83. As a result, the belt layer 8 has a high strength against the tensile force to the tire circumferential direction. In other words, since the belt cord 831 is arranged within a range of ±5° with respect to the tire circumferential direction, the circumferential belt layer 83 included in the belt layer 8 is hard to extend in the tire circumferential direction, and rigidity against the tensile force to the tire circumferential direction is secured. As a result, even when the pneumatic tire 1 rotates and the centrifugal force is generated in the belt layer 8, due to the rigidity of the circumferential belt layer 83 against the tensile force in the tire circumferential direction, the belt layer 8 is hard to extend in the tire circumferential direction. This circumferential belt layer 83 is disposed between the inner cross belt 82 and the outer cross belt 84 as the cross belt layer, thus relaxing the strain between layers of the inner cross belt 82 and the outer cross belt 84. As a result, the belt durability in the belt layer 8 can be improved. Note that the belt cover 85 protects the belt layer 8 from outward in the tire radial direction.

Here, the belt layer 8 has the circumferential belt layer 83 in this way, and is hard to extend in the tire circumferential direction. However, due to the centrifugal force at the time of rotation of the pneumatic tire 1, the belt layer 8 sometimes extends slightly. In particular, the belt layer 8 is relatively easy to extend from when use of a new pneumatic tire 1 is started until the state of each member is settled due to the passage of time by when the member is extended to the initial extension. In other words, while the belt layer 8 has the circumferential belt layer 83 and is hard to extend in the tire circumferential direction, the diameter of the belt layer 8 is easy to increase slightly due to extension in the tire circumferential direction from when use of the new pneumatic tire 1 is started until a predetermined period passes. Since this belt layer 8 also plays a role of supporting the carcass layer 7 or the tread portion 2 to set the entire shape of the tire, when the belt layer 8 extends and the diameter of the belt layer 8 increases, the diameter of the tread portion 2 also increases according to the belt layer 8. In other words, when the diameter of the belt layer 8 increases and the radial growth occurs in the belt layer 8, the diameter of the tread portion 2 also increases and the radial growth occurs in the tread portion 2.

Here, a wheel mounted on a large vehicle often has a camber angle set to positive camber, and the ground contact pressure with respect to the road surface in the tread surface 3 varies between the position closer to the vehicle outer side and the position closer to the vehicle inner side in the vehicle mounting direction. Specifically, the ground contact pressure in the vicinity of the shoulder portion 4 on the vehicle inner side is easy to be lower than the ground contact pressure in the vicinity of the shoulder portion 4 on the vehicle outer side. Since the centrifugal force is suppressed in the region having a high ground contact pressure, the radial growth of the tread portion 2 and the belt layer 8 is suppressed for the amount of suppression of the centrifugal force.

As a result, the radial growth of the tread portion 2 or the belt layer 8 in the vicinity of the shoulder portion 4 on the vehicle outer side after the use of the new pneumatic tire 1 is started is easy to be smaller than the radial growth in the vicinity of the shoulder portion 4 on the vehicle inner side. In other words, the radial growth of the tread portion 2 or the belt layer 8 in the vicinity of the shoulder portion 4 on the vehicle inner side is easy to be larger than the radial growth of the tread portion 2 or the belt layer 8 in the vicinity of the shoulder portion 4 on the vehicle outer side. In this way, in a case where the radial growth in the vicinity of the shoulder portion 4 on the vehicle inner side is large, wear is easier to occur in the shoulder portion 4 on the vehicle inner side than in the shoulder portion 4 on the vehicle outer side, and uneven wear occurs.

On the other hand, according to the pneumatic tire 1 of the present embodiment, while the tread gauges from the tread surface 3 of the tread portion 2 to the belt layer 8 are formed to be equal on the vehicle outer side and the vehicle inner side in the range in which the circumferential belt layer 83 is disposed, at positions located away from the equatorial plane CL toward the vehicle outer side and the vehicle inner side by 120% of half of the tire lateral direction dimension W between the end portions 83a of the circumferential belt layer 83, the tread gauge is formed such that the gauge H1out on the vehicle outer side and the gauge H1in on the vehicle inner side in the belt ply in the outermost side in the tire radial direction (outer cross belt 84) satisfy 1 mm≤H1in−H1out≤3 mm. According to this configuration, a tread gauge on the vehicle inner side is formed to be thicker than that on the vehicle outer side in a position in the vicinity of the shoulder portion 4 and in the vicinity of an end portion of the tire lateral direction of the belt layer 8. Therefore, the amount of a shoulder drop in the vicinity of the shoulder portion 4 on the vehicle inner side at the time of inflation is smaller than that on the vehicle outer side, the relative difference in the ground contact pressure of this portion with other portions is small, and the sliding difference of the tread surface 3 is suppressed to small. As a result, a friction energy in the vicinity of the shoulder portion 4 on the vehicle inner side can be reduced, and resistance to shoulder uneven wear can be improved. When H1in−H1out is less than 1 mm, an effect of reducing the friction energy in the vicinity of the shoulder portion 4 on the vehicle inner side is hard to be obtained. When H1in−H1out is greater than 3 mm, the ground contact pressure on the vehicle inner side increases and uneven wear is easy to occur in the vehicle outer side.

Note that in order to reduce the friction energy in the vicinity of the shoulder portion 4 on the vehicle inner side, and further improve the resistance to shoulder uneven wear, it is preferable that 1.5 mm≤H1in−H1out≤2.5 mm is satisfied.

In the pneumatic tire 1 according to the present embodiment, it is preferable that the gauge H2out on the vehicle outer side and the gauge H2in on the vehicle inner side in the shortest distance from the contact edge T of the tread portion 2 to the belt ply of the tire lateral direction maximum dimension (the inner cross belt 82 in the present embodiment) satisfy 1 mm≤H2in−H2out≤3 mm.

Here, the contact edge T refers to opposite outermost edges of the tire lateral direction of the ground contact region. The ground contact region is the region where the tread surface 3 of the tread portion 2 of the pneumatic tire 1 comes into contact with a dry flat road surface, when the pneumatic tire 1 is mounted on a regular rim, inflated to the regular internal pressure, and loaded with 70% of the regular load.

According to this pneumatic tire 1, a tread gauge on the vehicle inner side is formed to be thicker than that on the vehicle outer side in the vicinity of the contact edge T. Therefore, the amount of a shoulder drop in the vicinity of the shoulder portion 4 on the vehicle inner side at the time of inflation is smaller than that on the vehicle outer side, and the relative difference in the ground contact pressure of this portion with other portions is small, and the sliding difference of the tread surface 3 is suppressed to small. As a result, a friction energy in the vicinity of the shoulder portion 4 on the vehicle inner side can be reduced, and resistance to shoulder uneven wear can be further improved. When H2in−H2out is less than 1 mm, an effect of reducing the friction energy in the vicinity of the shoulder portion 4 on the vehicle inner side is hard to be obtained. When H1in−H1out is greater than 3 mm, the ground contact pressure on the vehicle inner side increases and uneven wear is easy to occur in the vehicle outer side.

Note that in order to reduce the friction energy in the vicinity of the shoulder portion 4 on the vehicle inner side and to further improve the resistance to shoulder uneven wear, it is preferable that 1.5 mm≤H2in−H2out≤2.5 mm is satisfied.

In the pneumatic tire 1 of the present embodiment, as illustrated in FIG. 1, it is preferable that a dimension Wr between insides in the tire lateral direction of the circumferential main grooves 10 located outermost in the tire lateral direction and the tire lateral direction dimension W of the circumferential belt layer 83 satisfy 0.9≤W/Wr≤1.1.

According to this pneumatic tire 1, the circumferential belt layers 83 are disposed inward in the tire radial direction of all land portions 11 excluding a land portion 11 in the outermost side in the tire lateral direction (in the vicinity of the shoulder portion 4), to suppress the radial growth. As a result, resistance to shoulder uneven wear can be further improved.

Note that, in order to further suppress the radial growth of all land portions 11 excluding the land portion 11 in the vicinity of the shoulder portion 4 and to remarkably obtain an effect of further improving the resistance to shoulder uneven wear, it is preferable that 0.95≤W/Wr≤1.05 is satisfied.

In the pneumatic tire 1 according to the present embodiment, as illustrated in FIG. 1, it is preferable that, when the pneumatic tire is mounted on a regular rim, inflated to the regular internal pressure, and in an unloaded state, the tire radial direction dimension D between an intersection point P of the tread surface 3 and an auxiliary line L1 extending from the end portion 83a of the circumferential belt layer 83 outward in the tire radial direction and an auxiliary line L2 extending in the tire lateral direction from the tire radial direction maximum position in the tread surface 3, and a tire lateral direction distance W1 from the tire equatorial plane CL to the end portion 83a of the circumferential belt layer 83 satisfy 0.01≤D/W1≤0.05.

According to this pneumatic tire 1, in a range of the tire lateral direction distance W1 from the tire equatorial plane CL to the end portion 83a of the circumferential belt layer 83, the difference with the maximum position in the tire radial direction of the tread surface 3 satisfies 0.01≤D/W1≤0.05, and the effect of suppressing the radial growth in the range of the tire lateral direction dimension of the circumferential belt layer 83 becomes remarkable. As a result, the pneumatic tire 1 can contribute to improvement in resistance to uneven wear in the vicinity of the shoulder portion 4 that is in the range of outward in the tire lateral direction of the circumferential belt layer 83.

In a pneumatic tire 1 according to the present embodiment, it is preferable that the tire is a heavy duty tire of single mounting having a nominal width of 355 mm or greater, an aspect ratio of 55% or less, and a rim diameter of 17.5 inches or greater.

According to this pneumatic tire 1, at the time of mounting on the vehicle, the tire is applied to a heavy duty tire of single mounting having the size as described above in which one wheel is used as single mounting method, instead of being used for dual mounting in which two wheels are mounted next to each other in the vehicle width direction in each end side of the drive shaft or trailer shaft, and this can provide a remarkable effect of improving resistance to shoulder uneven wear.

In the pneumatic tire 1 of the present embodiment, it is preferable that the relationship between the gauge H1out on the vehicle outer side and the gauge H1in on the vehicle inner side is set such that the belt layers 8 are symmetrically disposed in the tire lateral direction with the tire equatorial plane CL as a center, and profiles of the tread surface 3 are different in the tire lateral direction with the tire equatorial plane CL as a center.

According to this pneumatic tire 1, the tire can be manufactured by changing only a mold forming the tread surface 3, without changing others.

In the pneumatic tire 1 of the present embodiment, it is preferable that the relationship between the gauge H1out on the vehicle outer side and the gauge H1in on the vehicle inner side is set such that the profiles of the tread surface 3 are symmetrically disposed in the tire lateral direction with the tire equatorial plane CL as a center, and an arrangement of the belt layers 8 is made different in the tire lateral direction with the tire equatorial plane CL as a center.

According to this pneumatic tire 1, the tire can be manufactured by changing the configuration of the belt layer 8, without changing a mold forming the tread surface 3.

In the pneumatic tire 1 of the present embodiment, it is preferable that the relationship between the gauge H1out on the vehicle outer side and the gauge H1in on the vehicle inner side is set such that the profiles of the tread surface 3 are made different in the tire lateral direction with the tire equatorial plane CL as a center, and an arrangement of the belt layers 8 is made different in the tire lateral direction with the tire equatorial plane CL as a center.

According to this pneumatic tire 1, the profiles of the tread surface 3 and the arrangement of the belt layers 8 are made different to establish a relationship between the gauge H1out on the vehicle outer side and the gauge H1in on the vehicle inner side, and thus, while a situation where the profiles of the tread surface 3 and the arrangement of the belt layers 8 are largely unevenly different in the vehicle outer side and the vehicle inner side is prevented, resistance to shoulder uneven wear can be improved.

Note that, although the circumferential belt layer 83 is disposed between the inner cross belt 82 and the outer cross belt 84 as the cross belt layer in the embodiment described above, the circumferential belt layer 83 is not limited to this configuration. For example, the circumferential belt layer 83 may be disposed inward in the tire radial direction of the cross belt layer, between the inner cross belt 82 and the high angle belt 81. For example, the circumferential belt layer 83 may be disposed outward in the tire radial direction of the cross belt layer, between the outer cross belt 84 and the belt cover 85.

Examples

Figure 3:
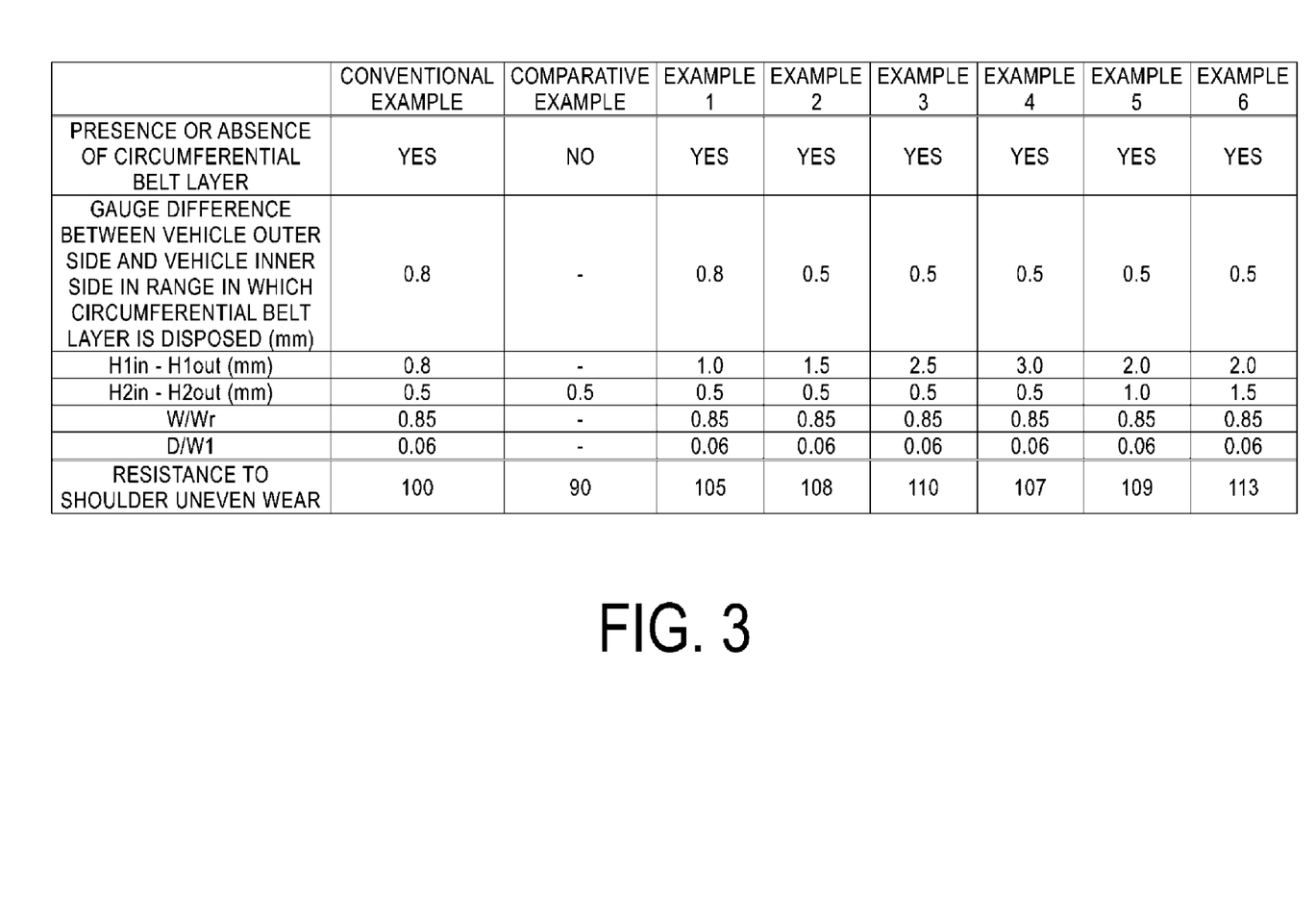
FIG. 3 is a table showing the results of performance tests of pneumatic tires according to examples of the present technology.
Figure 4:
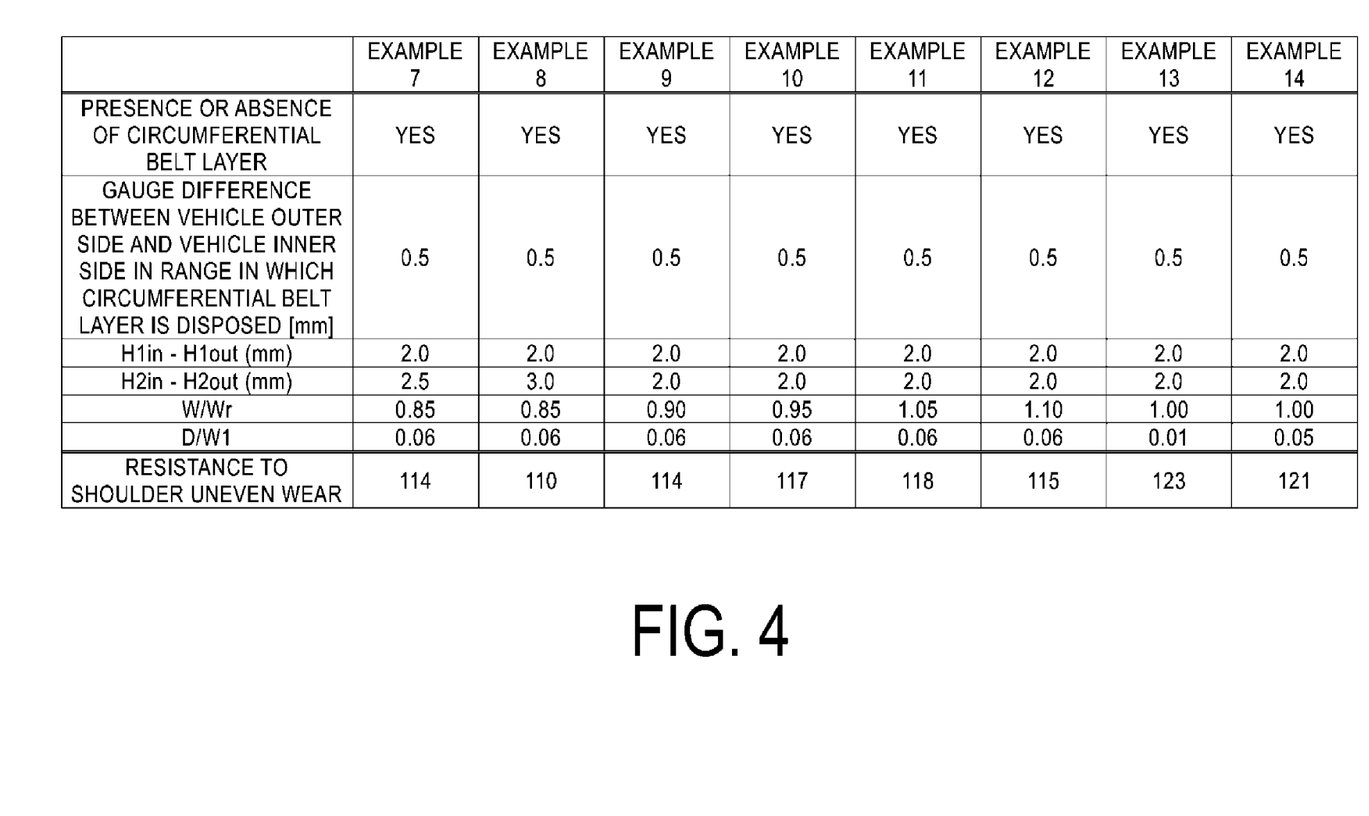
FIG. 4 is a table showing the results of performance tests of pneumatic tires according to examples of the present technology.

In the examples, performance tests for resistance to shoulder uneven wear were performed on a plurality of types of pneumatic tires of different conditions (see FIG. 3 and FIG. 4).

In this performance tests, a pneumatic tire (heavy duty pneumatic tire) of the tire size of 445/50R22.5 was mounted on the regular rim of 22.5"×14.00" and inflated to the regular internal pressure of 830 kPa.

In the performance tests for resistance to shoulder uneven wear, the pneumatic tire was mounted on a test vehicle (two-axis trailer), and the occurrence state of the shoulder wear after 100000 km of traveling was measured. The measurement results are expressed as index values and evaluated with the Conventional Example being assigned as the reference (100) for the degree of wear of the shoulder portion on the vehicle inner side with respect to the wear of the shoulder portion on the vehicle outer side. In this evaluation, larger values are preferable as they indicate that the difference between wear of the shoulder portion on the vehicle outer side and wear of the shoulder portion on the vehicle inner side is small, and the resistance to shoulder uneven wear is excellent.

In FIG. 3 and FIG. 4, each of the pneumatic tires of the Conventional Example, the Comparative Example, and Examples 1 to 14 includes a belt layer including a high angle belt, an inner cross belt, an outer cross belt, and a belt cover from inward in the tire radial direction as illustrated in FIG. 1. The pneumatic tire of the Comparative Example does not include the circumferential belt layer in the belt layer, and each of the pneumatic tires of the Conventional Example and the Examples 1 to 14 includes a circumferential belt layer in the belt layer. In the pneumatic tire of the Conventional Example, H1in−H1out is outside the specification in the tread gauge. On the other hand, in the pneumatic tires of the Examples 1 to 14, H1in−H1out is within the specification in the tread gauge.

As can be seen from the test results of FIG. 3 and FIG. 4, the pneumatic tires of Examples 1 to 14 have improved resistance to shoulder uneven wear.

The invention claimed is:

1. A pneumatic tire having designated vehicle inner and outer orientations at a time of mounting on a vehicle, the pneumatic tire comprising:
in a tread portion, a belt layer comprising a circumferential belt layer in which a belt cord is disposed along a tire circumferential direction, and a plurality of belt plies having a larger tire lateral direction dimension than a tire lateral direction dimension of the circumferential belt layer in which a belt cord is inclined toward the tire circumferential direction; wherein
a tread gauge from a tread surface of the tread portion to the belt layer is equal on a vehicle outer side and a vehicle inner side in a range in which the circumferential belt layer is disposed;
at positions located away from a tire equatorial plane toward the vehicle outer side and the vehicle inner side by 120% of half of the tire lateral direction dimension of the circumferential belt layer, a gauge H1out on the vehicle outer side and a gauge H1in on the vehicle inner side to a belt ply of the plurality of belt plies located outermost in a tire radial direction satisfy 1 mm≤H1in−H1out≤3 mm; and
a gauge H2out on the vehicle outer side and a gauge H2in on the vehicle inner side in a shortest distance from a contact edge of the tread portion to a belt ply of the plurality of belt plies with a tire lateral direction maximum dimension satisfy 1 mm≤H2in−H2out≤3 mm.

2. The pneumatic tire according to claim 1, wherein the pneumatic tire is a heavy duty tire of single mounting having a nominal width of 355 mm or greater, an aspect ratio of 55% or less, and a rim diameter of 17.5 inches or greater.

3. The pneumatic tire according to claim 1, wherein a relationship between the gauge H1out on the vehicle outer side and the gauge H1in on the vehicle inner side is set such that the belt layer is symmetrically disposed in the tire lateral direction with the tire equatorial plane as a center, and profiles of the tread surface are made different in the tire lateral direction with the tire equatorial plane as a center.

4. The pneumatic tire according to claim 1, wherein a relationship between the gauge H1out on the vehicle outer side and the gauge H1in on the vehicle inner side is set such that profiles of the tread surface are symmetrically disposed in the tire lateral direction with the tire equatorial plane as a center, and an arrangement of the belt layer is made different in the tire lateral direction with the tire equatorial plane as a center.

5. The pneumatic tire according to claim 1, a relationship between the gauge H1out on the vehicle outer side and the gauge H1in on the vehicle inner side is set such that profiles of the tread surface are made different in the tire lateral direction with the tire equatorial plane as a center, and an arrangement of the belt layer is made different in the tire lateral direction with the tire equatorial plane as a center.

6. The pneumatic tire according to claim 1, wherein
a plurality of circumferential main grooves extending along the tire circumferential direction in the tread surface are formed side by side in a tire lateral direction, and
a dimension Wr between insides in the tire lateral direction of circumferential main grooves of the plurality of circumferential main grooves located outermost in the tire lateral direction and a tire lateral direction dimension W of the circumferential belt layer satisfy 0.9≤W/Wr≤1.1.

7. The pneumatic tire according to claim 6, wherein, when the pneumatic tire is mounted on a regular rim, inflated to a regular internal pressure, and in an unloaded state, a tire radial direction dimension D between an intersection point P of the tread surface and an auxiliary line L1 extending from an end portion of the circumferential belt layer outward in the tire radial direction and an auxiliary line L2 extending in the tire lateral direction from a tire radial direction maximum position in the tread surface, and a tire lateral direction distance W1 from the tire equatorial plane to the end portion of the circumferential belt layer satisfy $0.01 \leq D/W1 \leq 0.05$.

8. The pneumatic tire according to claim 7, wherein the pneumatic tire is a heavy duty tire of single mounting having a nominal width of 355 mm or greater, an aspect ratio of 55% or less, and a rim diameter of 17.5 inches or greater.

9. The pneumatic tire according to claim 8, wherein a relationship between the gauge H1out on the vehicle outer side and the gauge H1in on the vehicle inner side is set such that the belt layer is symmetrically disposed in the tire lateral direction with the tire equatorial plane as a center, and profiles of the tread surface are made different in the tire lateral direction with the tire equatorial plane as a center.

10. The pneumatic tire according to claim 8, wherein a relationship between the gauge H1out on the vehicle outer side and the gauge H1in on the vehicle inner side is set such that profiles of the tread surface are symmetrically disposed in the tire lateral direction with the tire equatorial plane as a center, and an arrangement of the belt layer is made different in the tire lateral direction with the tire equatorial plane as a center.

11. The pneumatic tire according to claim 8, a relationship between the gauge H1out on the vehicle outer side and the gauge H1in on the vehicle inner side is set such that profiles of the tread surface are made different in the tire lateral direction with the tire equatorial plane as a center, and an arrangement of the belt layer is made different in the tire lateral direction with the tire equatorial plane as a center.

* * * * *